United States Patent [19]

Shimada et al.

[11] 4,344,308

[45] Aug. 17, 1982

[54] METHOD FOR COLD ROLLING AND CLEANING STEEL PLATES

[75] Inventors: Shoji Shimada, Kamakura; Sakae Sonoda, Yokohama; Kimio Yokoyama, Kawasaki, all of Japan

[73] Assignee: Nihon Parkerizing Co., Ltd., Japan

[21] Appl. No.: 171,397

[22] Filed: Jul. 23, 1980

[30] Foreign Application Priority Data

Jul. 25, 1979 [JP] Japan .................................. 54-94556

[51] Int. Cl.³ ......................... B21B 45/02; B21B 45/06
[52] U.S. Cl. ........................................................ 72/39
[58] Field of Search .................. 29/DIG. 7, DIG. 32, 29/81 B, 81 K; 72/39, 40; 134/9, 15, 16

[56] References Cited

U.S. PATENT DOCUMENTS

| | | | |
|---|---|---|---|
| 2,234,153 | 3/1941 | Herbert | 72/39 |
| 3,811,305 | 5/1974 | Saylor | 72/39 |
| 4,043,166 | 8/1977 | Leroy | 72/39 |
| 4,233,830 | 11/1980 | Houdion . | |

FOREIGN PATENT DOCUMENTS

| | | | |
|---|---|---|---|
| 47-9729 | 3/1972 | Japan | 72/39 |
| 51-5821 | 2/1976 | Japan | 72/39 |
| 51-86029 | 7/1976 | Japan | 72/39 |
| 53-80358 | 7/1978 | Japan | 72/39 |

*Primary Examiner*—Ervin M. Combs
*Attorney, Agent, or Firm*—Ostrolenk, Faber, Gerb & Soffen

[57] ABSTRACT

A cleaning method for steel plates is disclosed for removing rolling oil and metal powders by spraying highly pressurized cleaning solution on both surfaces of strip steel plates immediately before and/or after the final step in the cold-rolling process of the strip steel plates. The cleaning may be performed with efficiency by mixing abrasive grains, a rust inhibitor, a surface active agent or the like in the cleaning solution.

7 Claims, 3 Drawing Figures

METHOD FOR COLD ROLLING AND CLEANING STEEL PLATES

BACKGROUND OF THE INVENTION

The present invention relates to a method for cleaning surface of a steel plate during cold rolling and, more particularly, to a cleaning method for removing from the surface of the steel plate the rolling oil and the metal powders generated inside the cold-rolling machine during the cold-rolling procedure so as to facilitate the subsequent processes.

Cold-rolled steel plates are often used for automobile bodies, shells of electrical equipment for homes and so on. After the cold-rolling process, processes of annealing, phosphate chemical conversion treatment and so on are performed. Since the cold rolling is performed under the presence of the rolling oil in the cold-rolling method of steel plates, the rolling oil and the metal powders from abrasion remain attached to the surfaces of the steel plates after the cold rolling. If annealing is performed while the rolling oil and the metal powders are attached to the surfaces of the steel plates, carbon and metal powders remain on the surfaces of the steel plates after the annealing. Thus, even if treatments such as the chemical conversion treatment are performed on such surfaces, the treated surfaces are not free from quality degradation, so that desirable products may not be obtained. Accordingly, it is general practice to perform immersion cleaning or electrolytic cleaning of the steel plates so as to obtain steel plates with clean annealed surfaces.

Electrolytic cleaning is generally performed at a solution temperature of over 80° C. (over 60° C. at least) and adopts an alkali water solution for providing electrical conductivity in the solution. The metal plate must be rinsed with water after the cleaning for removing the alkalis attached to the plate. Consequently, the equipment for performing these treatments becomes big in size and the processing cost of the steel plates greatly increases. This method is also defective in that a great amount of exhaust water which contains oil and alkali is generated from the equipment. The installation of the processing equipment is cumbersome and expensive.

The mill-clean method has also been proposed which attempts to decrease the amount of carbon precipitated on the surfaces of the steel plates during the annealing process by improving the composition of the rolling oil. However, in this method, part of the rolling oil which has entered the annealing atmosphere evaporates during the temperature rise of the annealing procedure to be dispersed outside the system with the annealing gas, and most of the rolling oil, in the presence of hydrogen, precipitates carbon on the surfaces of the steel plates by precipitation decomposed carbon of under the presence of hydrogen or by decomposing hydrocarbons to lower class hydrocarbons. The iron powder generated from the rolling remains adhered to the surfaces of the steel plates, adversely affecting the corrosion resistance of the painted products.

One object of the present invention is, therefore, to provide a cleaning method for steel plates according to which the equipment and procedure of the method are simple and the degree of cleaning obtainable is high.

Another object of the present invention is to provide a cleaning method for steel plates according to which a higher degree of cleaning can be performed at less cost.

A still further object of the present invention is to provide a cleaning method for steel plates which does not generate harmful exhaust water.

To the above and other ends, the present invention provides a cleaning method for steel plates according to which highly pressurized solution is sprayed on both surfaces of a strip steel plate immediately before and/or after the final rolling during the cold-rolling process of the strip steel plate, this highly pressurized solution sprayed under the conditions of:

$$(T)^3 \times P > 3.5 \times 10^5$$

(where T is the temperature of the cleaning solution in °C., and P is the pressure of the cleaning solution in kg/cm$^2$) such that the higher the temperature and the pressure of the sprayed water, the more efficient the removal of the rolling oil and the metal powders from abrasion and the smaller the amount of the sprayed water required for this purpose.

By mixing abrasive grains in the spraying solution for cleaning the surfaces of the steel plates by abrasion, the cleaning may be performed with higher efficiency, the rolling oil and the metal powders from abrasion attached during the cold-rolling process are effectively removed, and the problems arising during the subsequent processes of the annealing are eliminated.

Further, by adding a rust inhibitor and/or a surface active agent to the highly pressurized solution, the surface may be made rustproof as the surface processing is performed, thereby facilitating the processes to follow.

DETAILED DESCRIPTION OF THE PREFERRED EMBODIMENTS

Figure 1:
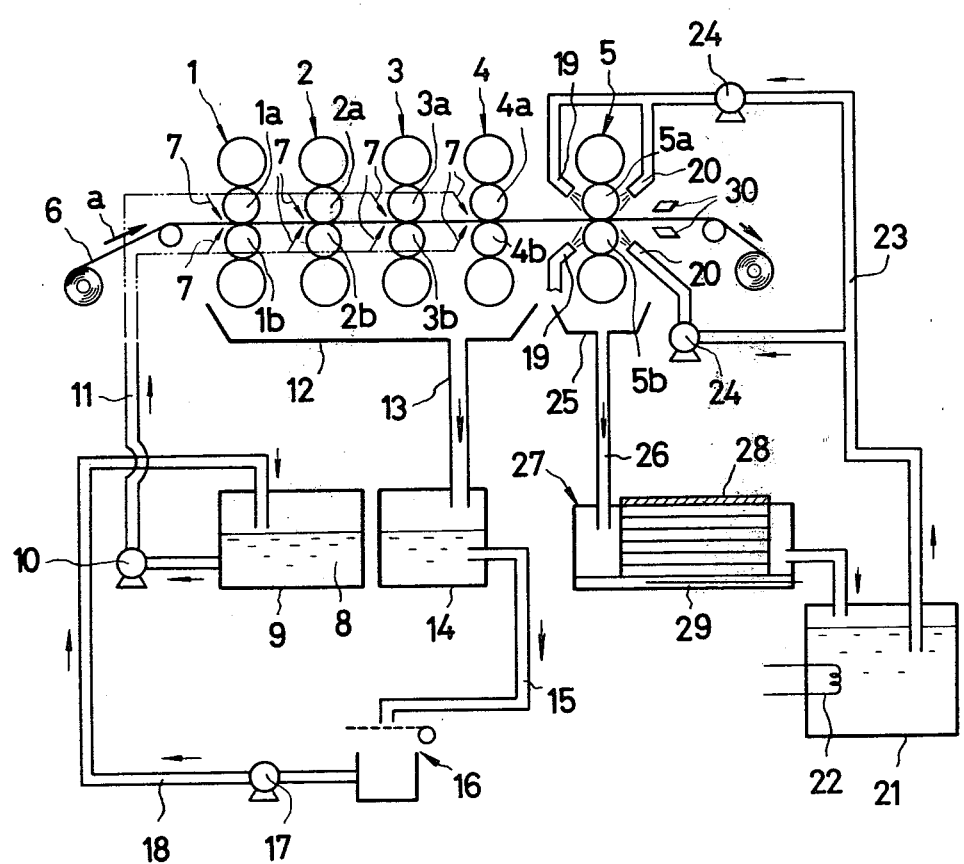
FIG. 1 is a schematic view illustrating one embodiment of the cleaning method of the present invention.

FIG. 1 shows an embodiment in which the surface of a steel plate is cleaned during the rolling procedure. The cold-rolling apparatus used is of five-stand type wherein reference numeral 1 denotes a first stand; 2, a second stand; 3, a third stand; 4, a fourth stand; and 5, a fifth stand, having rolling rolls 1a and 1b; rolling rolls 2a and 2b; rolling rolls 3a and 3b; rolling rolls 4a and 4b; and rolling rolls 5a and 5b, respectively. A steel plate 6 to be rolled runs in the direction shown by the arrow a between the rolling rolls of each stand. The rolled steel plate is either directly supplied to an annealing apparatus or wound, for example, in a coil shape at the terminal end.

The rolling rolls of stands 1–4 among the five stands are sprayed with a rolling oil emulsion 8 from corresponding nozzles 7. The rolling oil emulsion 8 is collected in a clean tank 9 and is sprayed by a pump 10 from the above-mentioned nozzles 7 through a pipe 11. The extra sprayed rolling oil emulsion 8 is received by a receiving pan 12 disposed at the lower part of the rolling stands. It is then collected through a conduit 13 in a dirty tank 14. After it is made to flow out through a pipe 15 to be filtered by a Hoffman filter 16 for cleaning, it is returned by a pump 17 to the clean tank 9 through a pipe 18 for reuse.

In the cold-rolling apparatus of this construction, two pairs of vertically disposed nozzles 19 and 20 spray a highly pressurized solution immediately before and after the fifth stand. This solution is heated to a predetermined temperature by a heater 22 at a cleaning solution tank 21 and is sprayed under high pressure by a pump 24 through a pipe 23. The contaminated solution including the rolling oil and the iron powder removed from the surface of the steel plate by the spraying is collected by a receiving pan 25 and is supplied through a pipe 26 to an oil separating apparatus 27. This oil separating apparatus is provided with an oil separating skimmer 28 and a sludge removing means 29 for cleaning the solution. The cleaned solution is returned to the cleaning solution tank 21 for reuse.

In this cold-rolling apparatus, after the rolling oil and the iron powder are removed by spraying with highly pressurized cleaning solution, a pair of vertically disposed air spraying nozzles 30 spray compressed air or dry air for removing the drops of cleaning solution on both surfaces of the steel plate 6.

The strip steel plate 6 is thus continuously rolled by the cold-rolling apparatus of this construction. The rolling is performed as the rolling oil emulsion is supplied near each rolling roll of the first to fourth stands, and a highly pressurized cleaning solution is sprayed before and after the rolling rolls 5a and 5b of the fifth stand 5. The spraying pressure of the cleaning solution must satisfy the conditions defined by the following inequality:

$$(T)^3 \times P > 3.5 \times 10^5$$

(where T is the temperature of the cleaning solution in °C., and P is the pressure of the cleaning solution in kg/cm$^2$). It has been found that it is advantageous to use a cleaning solution of a temperature of over 10° C., and preferably 20° C. more than the temperature of the rolling oil emulsion. This is because the spraying pressure may then be made smaller, and the subsequent rolling oil collecting process is more convenient. Further, the same effects can be obtained even with a high temperature cleaning solution of a temperature higher than any of the inversion points of all the additives used in the rolling oil.

A test was conducted using an apparatus as shown in FIG. 1 under the conditions specified below:

| | |
|---|---|
| Fifth stand rolling speed | 2,000 m/min |
| Rolling oil concentration used at first–fourth stands | 3 wt % |
| Inversion point of rolling oil | 55° C. |
| Fifth stand cleaning solution spraying pressure | 3 kg/cm$^2$ |
| Fifth stand cleaning solution temperature | 80° C. |
| Fifth stand cleaning solution spraying rate | 400 l/min |

The oil concentration of the returned contaminated solution from the rolling machine was 0.67 wt %, and the oil concentration of the solution sprayed from the oil separating apparatus after remaining 10 minutes was 0.203 wt %.

The average amount of rolling oil remaining on the steel plate after the conventional method was 0.5 g/m$^2$. However, the amount of rolling oil remaining on the surface of the cold-rolled steel plate obtained under the above-mentioned conditions was 0.03 g/m$^2$. This steel plate coil underwent general box annealing, and the ease of the chemical conversion processing of the surface of this steel plate was substantially the same as that of a plate which has undergone the electrolytic cleaning process.

Using the same apparatus, abrasive grains, a rust inhibitor, a surface active agent, and so on were mixed in the cleaning solution for spraying. Abrasive grains which may be used for this purpose include one or more of the following: iron phosphate, zinc phosphate, calcium phosphate, manganese phosphate, sand iron powder, iron powder, iron oxide powder and so on.

The highly pressurized solution to be sprayed on the front and back surfaces of the fifth stand included 2 wt % of phosphate sludge, a rust inhibiting anion surface active agent, and 0.3 wt % of dodecylamine polyethylene oxide. This cleaning solution was sprayed at a pressure of 20 kg/cm$^2$ and a rate of 200 l/min for processing the front and rear surfaces of the steel plate. Before winding, this steel plate was sprayed with compressed air at a pressure of 10 kg/cm$^2$ for removing the attached solution.

It was confirmed that the amount of rolling oil remaining on the surface of the steel plate thus processed was below 0.005 g/m$^2$. The phosphate pickling ability was tested after annealing and found to be vastly improved in comparison with steel plates processed with other methods, as may be seen from Table 1 below.

TABLE 1

| Processing Method | Initial Phosphate Crystal Nucleus Number |
|---|---|
| I 5% Rolling oil applied to all stands | 50 × 10$^4$/cm$^2$ |
| II 5% rolling oil applied to first–fifth stands Highly pressurized solution sprayed after fifth stand | 100 × 10$^4$/cm$^2$ |
| III Embodiment of the present invention | 180 × 10$^4$/cm$^2$ |

The crystal nucleus number of the formed phosphate as shown in Table 1 above was measured three seconds after the phosphate pickling by spraying.

Figure 2:
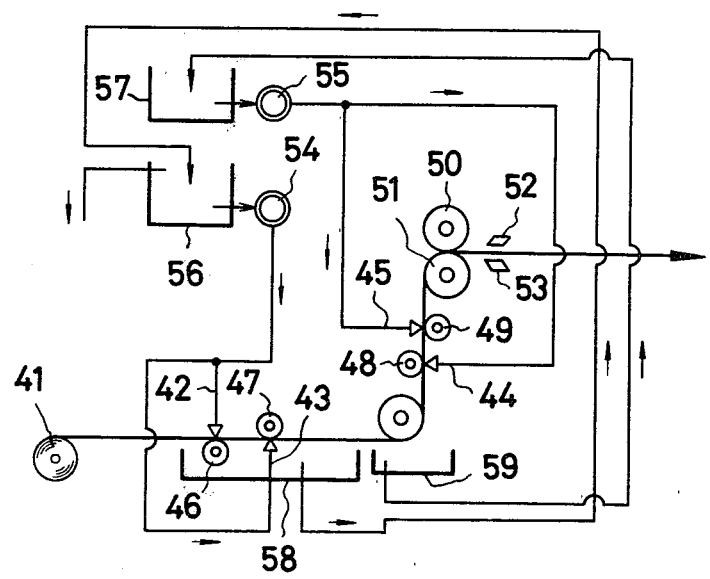
FIG. 2 is a schematic view illustrating another embodiment of the method of the present invention.

According to the processing method of the second embodiment of the present invention shown in FIG. 2, the cleaning processing is performed before rewinding and annealing a steel plate 41. Spraying nozzles 42 and 43 for the highly pressurized solution containing abrasive grains and spraying nozzles 44 and 45 for the highly pressurized solution are included. Backup rolls 46, 47, 48 and 49 are disposed in opposition to these spraying nozzles. Squeeze rolls 50 and 51 and gas wipers 52 and 53 are also included. The cleaning solution sprayed from the spraying nozzles 42 and 43 contains 3 wt % of phosphate sludge, and, if necessary, a rust inhibiting anion surface active agent and 0.3 wt % dodecylamine polyethylene oxide. It is sprayed by a pump 54 at a pressure of 20 kg/cm$^2$ and at a rate of 200 l/min on both the front and rear surfaces of the steel plate 41. The spraying nozzles 44 and 45 spray a solution containing 0.2 wt % of alkylamine polyethylene oxide at a pressure of 100 kg/cm$^2$ and a rate of 100 l/min by a pump 55 on both the front and rear surfaces of the steel plate. After the solution is removed by the squeeze rolls 50 and 51, the steel plate is dried by the gas wipers and is transported to the annealing process which follows. The processing solutions are received by tanks 56 and 57, respectively, to be supplied to respective storage tanks 58 and 59 for reuse. In order to facilitate smooth continuous processing, in each tank the abrasive grains are removed with the rolling oil mixed therewith and some new abrasive grains are added for adjustment. Fresh water is also added in an amount corresponding to the exhausted solution.

It is confirmed that the amount of the rolling oil remaining on the surface of the steel plate thus processed was below 0.005 g/m². When the phosphate pickling ability was tested after the annealing, it was found to be vastly improved in comparison with steel plates processed with other methods, as may be seen from Table 2 below.

TABLE 2

| Processing Method | Initial Phosphate Crystal Nucleus Number |
|---|---|
| 1 No degreasing | $80 \times 10^4$/cm² |
| 2 Electrolyc degreasing (2% orthosilicic acid, 10 A/dm²) | $100 \times 10^4$/cm² |
| 3 Second embodiment of the present invention | $180 \times 10^4$/cm² |

The crystal nucleus number of the formed phosphate as shown in Table 2 above was measured three seconds after processing with the phosphate pickling solution of Bonderite 137 (trademark).

Figure 3:
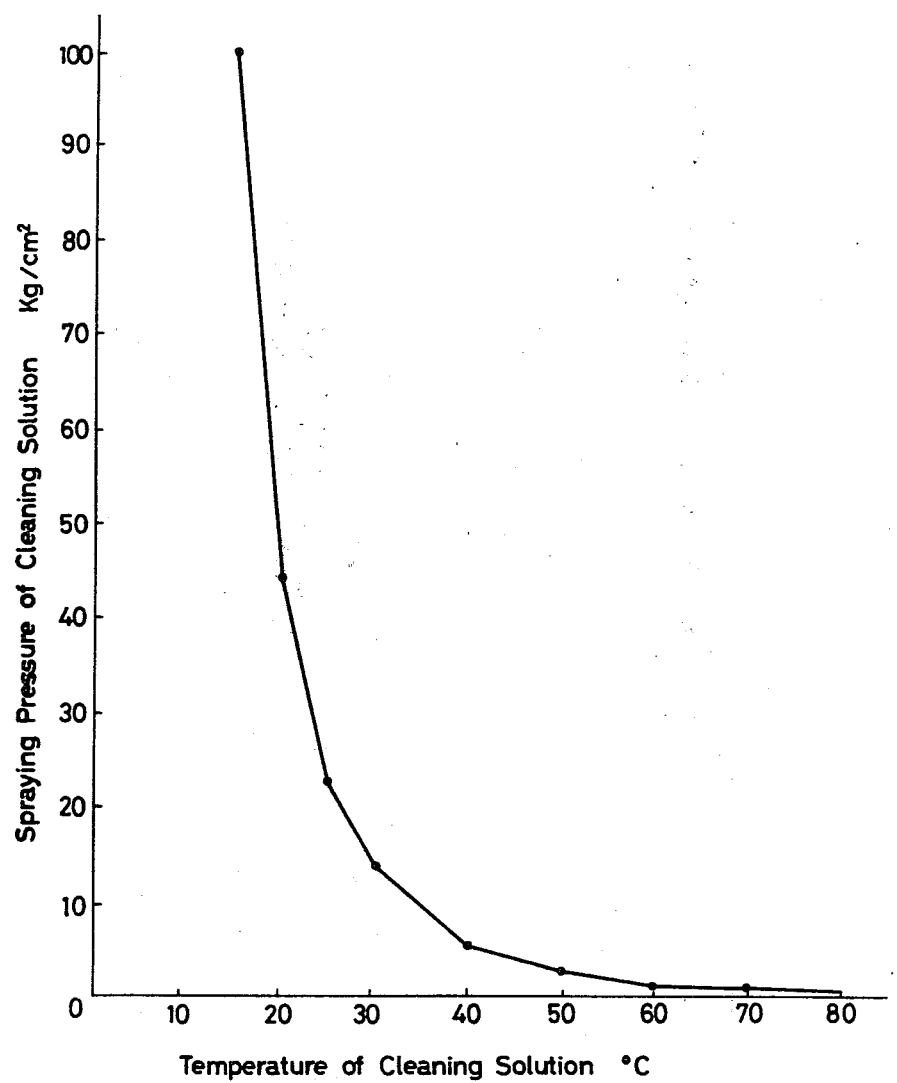
FIG. 3 is a graph illustrating the relation between the temperature and the pressure of the cleaning solution in accordance with the method of the present invention.

In either of the embodiments as described above, the higher the temperature of the cleaning solution and the spraying pressure, the easier and more complete the removal of the rolling oil and the metal powder attached to the strip steel plate. Thus, the amount of cleaning solution required may be reduced. The relation between the temperature and the spraying pressure of the cleaning solution is as shown by the graph of FIG. 3, and the area shown at the right of the graph line in this Figure represents the range applicable to the method of the present invention.

Since the amount of spraying solution may be reduced by raising the temperature and spraying pressure of the cleaning solution, the oil separating apparatus for separating and removing the rolling oil and the metal powder from the cleaning solution for reuse may be made compact in size. The fact that the amount of cleaning solution may be reduced means that the solution may remain in the oil separating apparatus longer than in conventional cases. Thus, the separating efficiency is vastly improved and the cleaning solution may be reused in a cleaner state.

When the abrasive grains and the surface active agent are mixed in the cleaning solution, the abrasive grains in the cleaning solution collide with the surface of the steel plate when sprayed under pressure. Thus, it is possible to abrade the surface of the steel plate for removing the attached substances such as the rolling oil and the metal powders. Furthermore, since the abrasive grains are charged oppositely to the rolling oil and the abraded metal powders, they coagulate, facilitating effective removal of the contaminating substances.

Further, when the steel plate as a final product is phosphate pickled for use in automobiles and light electrical appliances and so on, a material having a crystal system same as that of phosphate such as an insoluble phosphate of Zn, Mn, and Fe or a sludge formed during the phosphate pickling procedure may be used as an abrasive grain material. When abrasive grains are used, a large number of sharp surfaces of the sprayed abrasive grains eat into the surface of the steel plate uniformly. These fine abrasive grains remain there during the annealing and quality adjusting rolling processes. When general phosphate pickling is performed on such a steel plate, the fine abrasive grains form precipitating nuclei for the phosphates. Thus, the phosphate pickling ability is vastly improved.

What is claimed is:

1. In a method of cold rolling and cleaning metal strip characterized in that a pressurized cleaning solution is sprayed on both opposite planar surfaces of a metal strip immediately before and after at least a final rolling step, wherein the improvement comprises maintaining the relationship between the temperature and the pressure of said cleaning solution in accordance with the inequality;

$$(T)^3 \times P > 3.5 \times 10^5,$$

wherein T is the temperature of said cleaning solution in °C., and P is the pressure of said cleaning solution in kg/cm².

2. A cold rolling and cleaning method as recited in claim 1 wherein said cleaning solution has a temperature at least 10° C. higher than the temperature of a rolling oil emulsion applied to the strip and is sprayed on both said opposite planar surfaces of said metal strip immediately before and after said final rolling step and before a penultimate rolling step.

3. A cold rolling and cleaning method as recited in claim 1 wherein said metal strip is a steel plate and said pressurized cleaning solution contains abrasive grains and is applied to said plate before the final rolling step and after a penultimate rolling step.

4. A cold rolling and cleaning method as recited in claim 1 wherein said metal strip is a steel plate and said pressurized cleaning solution contains abrasive grains and is applied to said plate before annealing and coiling said plate and after said final rolling step.

5. A cold rolling and cleaning method as recited in claim 1 wherein said pressurized cleaning solution is sprayed on both said opposite planar surfaces of said metal strip under a pressure of at least 20 kg/cm² before and after said final rolling step and after a penultimate rolling step.

6. A cold-rolling and cleaning method as recited in claim 1 or 2 wherein the cleaning solution is at a temperature higher than the inversion points of all additives contained in the rolling oil.

7. A cold-rolling and cleaning method as recited in claim 1, 3 or 4 wherein contaminated cleaning solution is supplied to an oil separating apparatus for separation and removal of at least 50 wt % of rolling oil emulsion and iron and thereafter reused as the cleaning solution.

* * * * *